US012288326B2

(12) United States Patent
Castiglioni et al.

(10) Patent No.: US 12,288,326 B2
(45) Date of Patent: Apr. 29, 2025

(54) METHOD FOR GENERATING MODELS TO AUTOMATICALLY CLASSIFY MEDICAL OR VETERINARY IMAGES DERIVED FROM ORIGINAL IMAGES INTO AT LEAST ONE CLASS OF INTEREST

(71) Applicant: DEEPTRACE TECHNOLOGIES S.R.L., Milan (IT)

(72) Inventors: Isabella Castiglioni, Milan (IT); Matteo Interlenghi, Milan (IT); Annalisa Polidori, Milan (IT); Christian Salvatore, Milan (IT)

(73) Assignee: DEEPTRACE TECHNOLOGIES S.R.L., Milan (IT)

( * ) Notice: Subject to any disclaimer, the term of this patent is extended or adjusted under 35 U.S.C. 154(b) by 327 days.

(21) Appl. No.: 17/755,289

(22) PCT Filed: Oct. 28, 2020

(86) PCT No.: PCT/EP2020/080275
§ 371 (c)(1),
(2) Date: Apr. 26, 2022

(87) PCT Pub. No.: WO2021/083954
PCT Pub. Date: May 6, 2021

(65) Prior Publication Data
US 2022/0375077 A1 Nov. 24, 2022

(30) Foreign Application Priority Data
Oct. 31, 2019 (IT) .................... 102019000020200

(51) Int. Cl.
*G06T 7/00* (2017.01)
*G06V 20/69* (2022.01)

(52) U.S. Cl.
CPC ............ *G06T 7/0012* (2013.01); *G06V 20/69* (2022.01); *G06V 2201/03* (2022.01)

(58) Field of Classification Search
CPC ... G06T 7/0012; G06V 20/69; G06V 2201/03
See application file for complete search history.

(56) References Cited

U.S. PATENT DOCUMENTS 11,728,035 B1 * 8/2023 Douglas .................... G06T 7/11
 705/2
11,861,762 B2 * 1/2024 Li ........................... G06T 11/60
(Continued)

OTHER PUBLICATIONS

Eaton-Rosen et al., "Improving Data Augmentation for Medical Image Segmentation", 1st Conference on Medical Imaging with Deep Learning, 2018, pp. 1-3.
(Continued)

*Primary Examiner* — Fayyaz Alam
(74) *Attorney, Agent, or Firm* — LUCAS & MERCANTI, LLP

(57) ABSTRACT

A method to generate predictive models to automatically classify, medical or veterinary images derived from original images is disclosed. The method is computer-implemented and includes the steps:
selection of at least one class of interest wherein the classes of interest characterize predictions;
construction of a database containing a plurality of data structures representative of derived images and generated by processing original images in such a way that they can be used for surrogate of real biopsies with real staining media performed by means of medical imaging systems;
association to the classes of interest of said data structures; and
training of at least one model using the data structures on the basis of the differences in the distribution of expres-
(Continued)

sion levels of measured characteristics of the derived images, to classify each of the derived images in classes of interest.

4 Claims, 8 Drawing Sheets

(56) References Cited

U.S. PATENT DOCUMENTS

| | | | |
|---|---|---|---|
| 11,948,296 B2* | 4/2024 | Yu | G16H 10/40 |
| 2017/0053398 A1 | 2/2017 | Mahoor et al. | |
| 2017/0357844 A1* | 12/2017 | Comaniciu | G16H 30/00 |
| 2018/0130207 A1* | 5/2018 | Anderson | G06V 20/698 |
| 2018/0240233 A1* | 8/2018 | Kiraly | G06T 7/0012 |
| 2019/0237186 A1* | 8/2019 | El-Baz | G16H 30/40 |
| 2020/0342359 A1* | 10/2020 | Hu | G16H 30/40 |
| 2022/0375077 A1* | 11/2022 | Castiglioni | G06V 20/69 |
| 2024/0029247 A1* | 1/2024 | Petitjean | G06T 7/0012 |

OTHER PUBLICATIONS

International Search Report and Written Opinion for Corresponding International Application No. PCT/EP2020/080275, Jan. 26, 2021, 21 pages.
Search Report for Corresponding Italian Application No. 201900020200, Jul. 1, 2020, 2 pages.

* cited by examiner

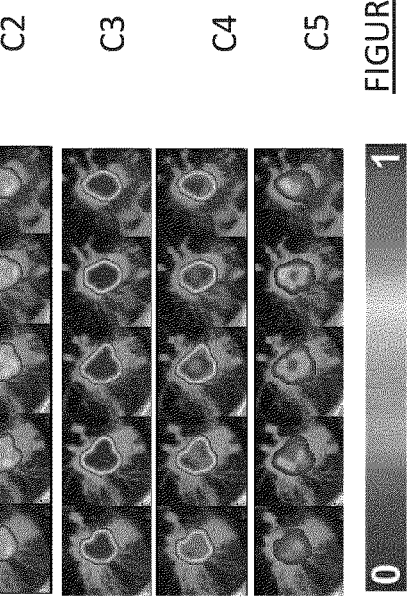
FIGURE 4c
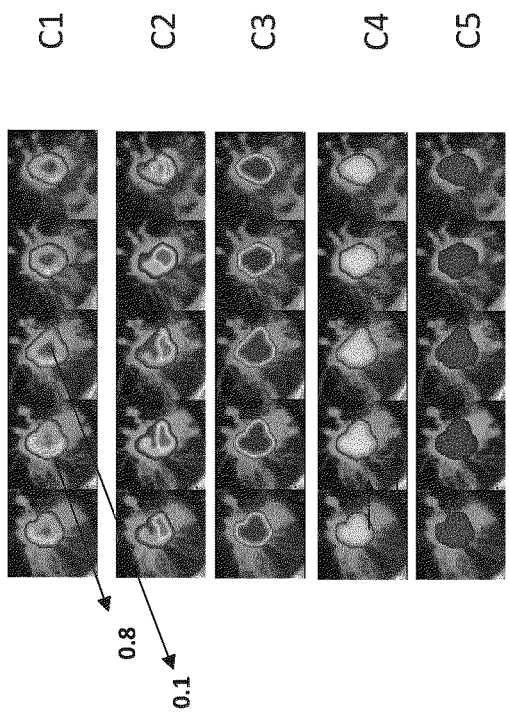
0.8
0.1
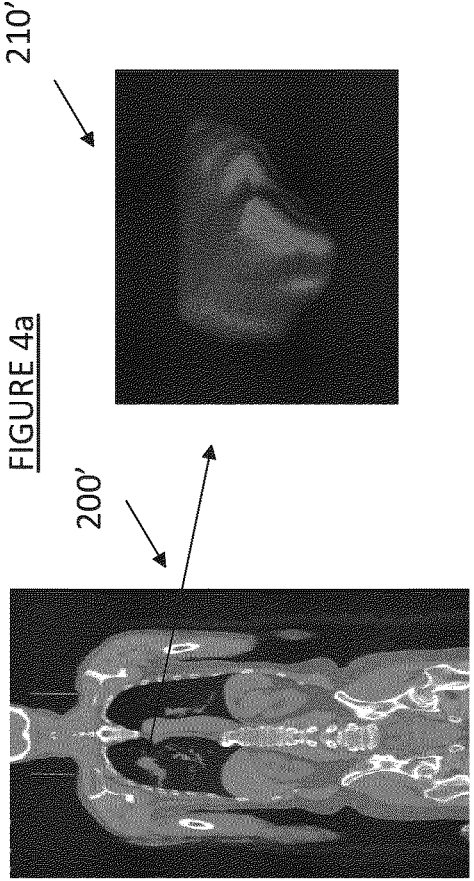
FIGURE 4d
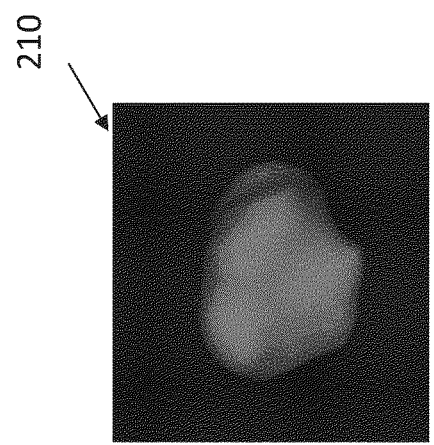
210
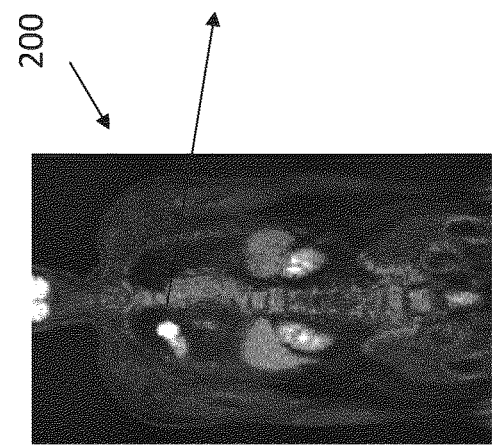
200
FIGURE 4a
FIGURE 4b

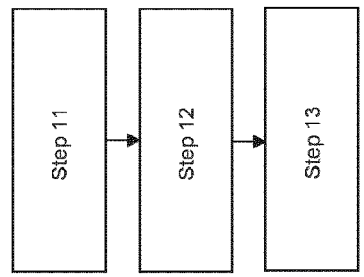
FIGURE 6d
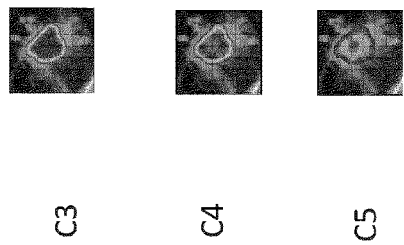
FIGURE 6e
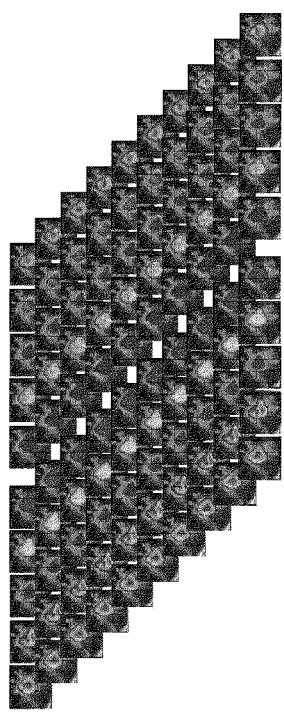
FIGURE 6b
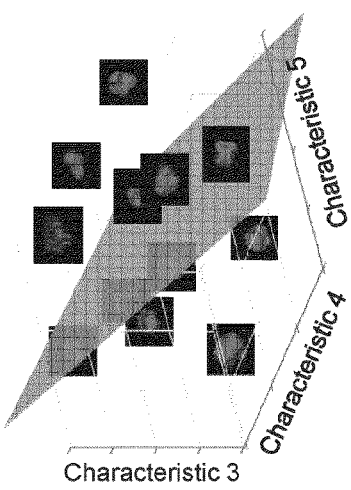
FIGURE 6c
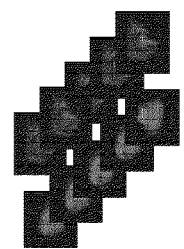
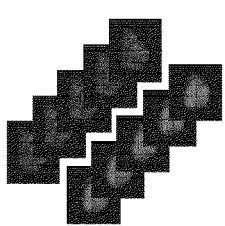
FIGURE 6a

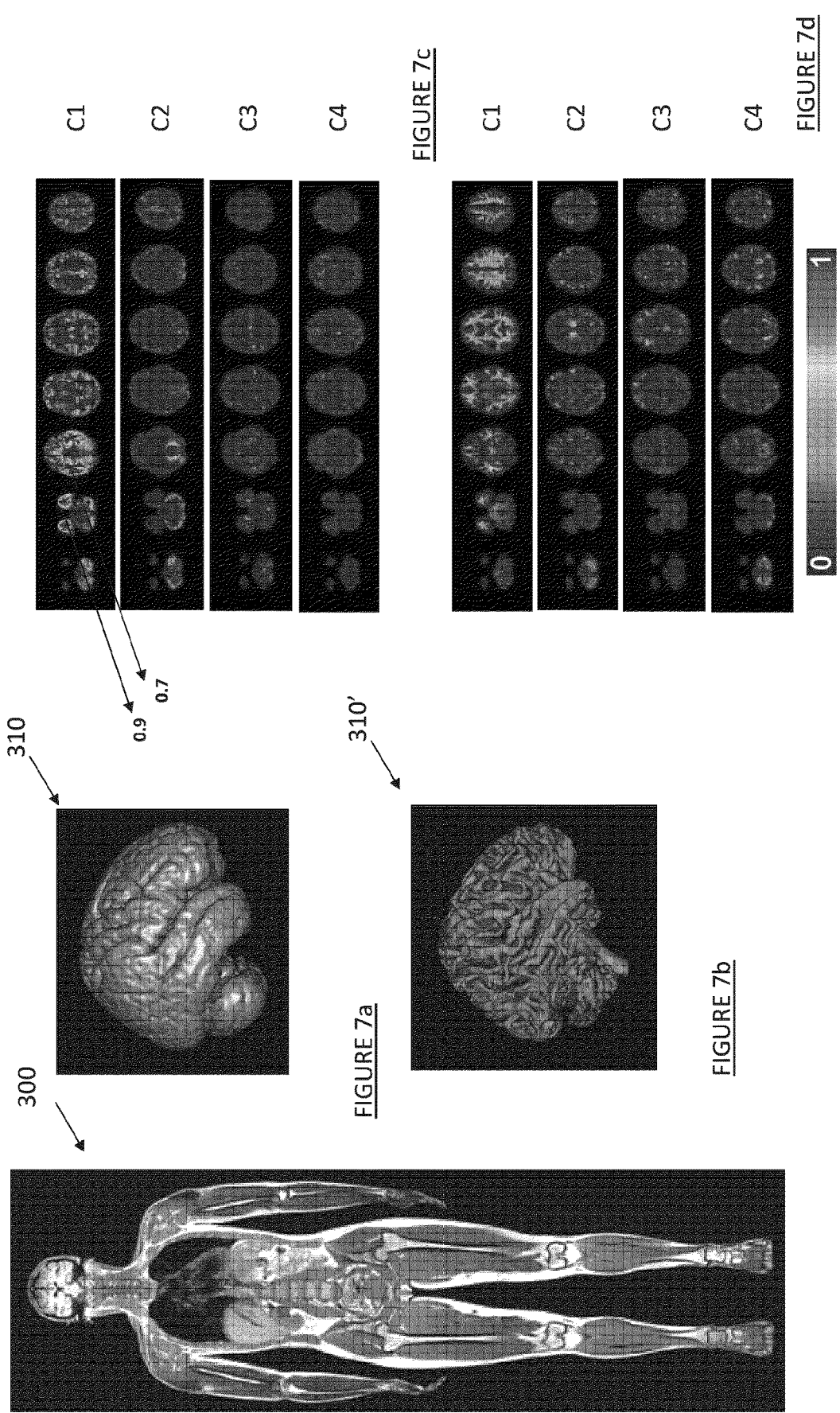

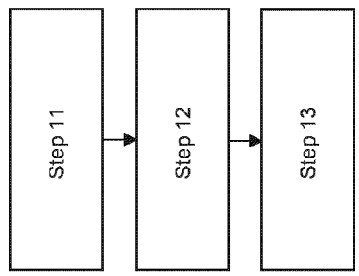
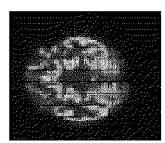 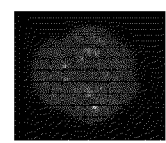
FIGURE 8d
C1    C3
FIGURE 8e
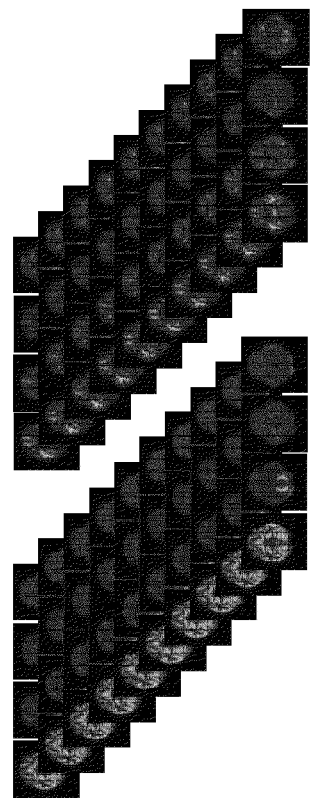
FIGURE 8b
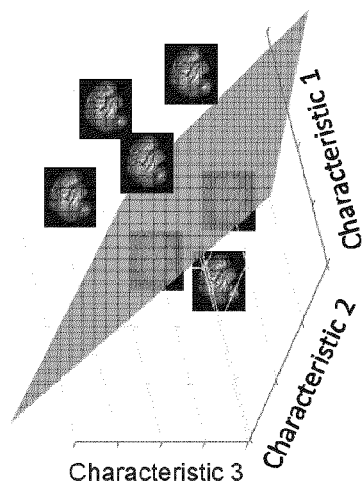
Characteristic 3
FIGURE 8c
Class 1
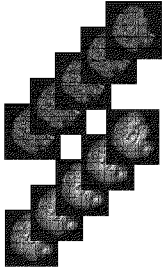
Class 2
FIGURE 8a

METHOD FOR GENERATING MODELS TO AUTOMATICALLY CLASSIFY MEDICAL OR VETERINARY IMAGES DERIVED FROM ORIGINAL IMAGES INTO AT LEAST ONE CLASS OF INTEREST

CROSS-REFERENCE TO RELATED APPLICATIONS

This application is a 371 of PCT/EP2020/080275, filed Oct. 28, 2020, which claims the benefit of Italian Patent Application No. 102019000020200, filed Oct. 31, 2019.

FIELD OF THE INVENTION

This invention refers to a method for generating models to automatically classify medical or veterinary images derived from original images into at least one class of interest.

PRIOR ART BACKGROUND OF THE INVENTION

It is known that most complex multifactorial diseases, including, for example, neurodegenerative and oncological diseases, are expressed in different subtypes, called phenotypes, which show different behaviors in their onset, progression and response to different therapeutic options. The identification of phenotypes represents one of the most complex challenges of medical research, but it is of fundamental importance for the personalization of therapy, because it is shown that different phenotypes respond very differently to the same therapy.

To date, the characterization of phenotypes is mainly carried out by means of the analysis of tissue biopsy with immunohistochemical techniques, characterizing, in two-dimensional samples (tissue sections fixed on slide), under the microscope, differences in the microarchitecture of the cells of the tissues where the disease is expressed and measuring some molecular biomarkers. As an example, a brain biopsy allows to determine the accumulation of specific proteins in the tissues and to verify a brain atrophy caused by neuronal death. Also, as an example, a biopsy of abnormal tissue in the breast allows to measure some specific molecules that express themselves differently in distinct subtypes of breast cancer. Immunohistochemistry techniques are based on the principle of antigen-antibody conjugation, according to which an antibody, immunized against the molecule that is looked for, recognizes it in addition with a means of detection (such as an enzyme or a fluorescent molecule) that makes visible under a microscope, by means of a staining, the reaction with the antibody looked for. Similar techniques are fluorescence microscopy (fluorescent molecules) and optical scanning microscopy (colloidal gold). However, these techniques suffer from the fact that the number of molecular biomarkers that can be measured is limited by the experimental approach and by the existence of a chemical detection medium that makes them visible to the light microscope.

In recent years genomics has emerged as the most promising technique to characterize disease phenotypes from a molecular point of view. The identification of activating gene mutations has paved the way for the first applications of genomics in oncology, radically changing the perspectives of study for some subtypes of tumors. In addition, the measurement of expression levels of thousands of genes by means of the new techniques of Next Generation Sequencing (NGS) has allowed, for many diseases, the definition of gene panels able to identify subtypes with different prognosis. However, even genomics, such as histopathological and immunohistochemical analysis, is a technique that involves invasive procedures performed from portions of tissue biopsies, whose results are still limited by the partiality, and sometimes even by regional randomness of the tissue sample taken and analyzed.

In fact, it has been recently shown, on biopsies of solid oncological lesions, that the portrait of the expressed genes and their mutations is strongly dependent on the sampling site, and that, depending on the region of the biopsy analyzed, the same gene can be expressed in a very different way suggesting opposite directions in therapeutic choices. No less important, the current biopsy analysis is performed on ex vivo tissue, and prevents the study of the phenotype in its microenvironment and living environment. Diagnostic imaging is a set of techniques by means of which it is possible to observe, non invasively, a region of an organism not visible to the outside. Different are the techniques of diagnostic imaging, depending on the physical principle underlying the acquisition of images. Among these, a particularly important role is played by Computed Tomography (CT), Magnetic Resonance Imaging (MRI), Positron Emission Tomography (PET), and Single Photon Emission Tomography (SPECT). Their use is recommended in the current guidelines of many diseases for diagnosis, including staging in the diagnostic evaluation, for addressing and monitoring therapy, and for the definition of the treatment plan in radiotherapy. In some of these techniques, specifically CT and MRI, biochemical agents are also available as contrast agents (e.g. barium, iodine, gadolinium) that can modify the way a region of the body appears in an image, improving its reading, in particular by accentuating tissue and vascularization differences.

Although the spatial resolution of these systems is much lower than that of microscopes, some of these technologies have significantly improved in recent years their performance in tams of signal-to-noise ratio on images, proving capable of capturing morphological and functional heterogeneity of the tissues studied, to the point of reducing by half the amount of contrast medium.

As an example, using CT or MRI images without contrast medium it is now possible to observe lesions of the order of a few mm, with infiltrations or necrosis inside the tissue, and it is possible to see any irregularities of shape. By means of PET images, depending on the radiopharmaceutical used, it is possible to see the expression of specific tissue functions, such as, for example, cellular glucose metabolism or the expression of particular receptors.

However, the observation of these images by medical specialists is still very limited by the human response to reading the images. If the data structure of a CT, MRI or PET image is able to quantify more than 65,000 levels of signal intensity, however, it must be considered that humans can distinguish less than 20 levels of gray intensity in an image; their ability to capture quantitative differences in tissue architecture and morphology on these images is very limited.

One aim of the present invention is to overcome the technical problems of histopathological-immunohistochemical analyses and of genomic analyses carried out on ex vivo biopsies, also taking into account the fact that these analyses, besides being particularly invasive both in man and animal, can lead to partial results. Taking advantage of the benefits offered by the current quantitative techniques of diagnostic imaging, the invention aims to enhance its performance in tams of images by means of a processing method capable of changing the way in which a region of the body appears in such images, expressing, in tissues (and/or tissue functions) of organs or any other structure or body part, in the presence or absence of pathology, characteristics such as to make visible on the processed images information that would otherwise not be appreciable or perceivable to the naked eye, displaying them with "virtual contrast media".

Taking advantage of this new ability, the invention allows to realize "virtual biopsies" of tissues (and/or tissue functions) of organs or any other structure or body part, in the presence or absence of pathology, as digital surrogates of real biopsies measuring levels of expression of their architectural, morphological and functional complexity not appreciable to the naked eye. A further aim of the invention is to provide the possibility to use such virtual biopsies to realize advanced predictive models of automatic image classification of virtual biopsies, incorporating, within the classifiers, methods of data selection, training and validation superior to those of known automatic classifiers applied to the image sector, by means of the integration of innovative procedures aimed at 1) overcome the practical difficulties of performing diagnostic studies for repeated imaging over time, the comparison of which is used to ensure reliable analysis of virtual biopsies;
2) harmonize the methods of analysis of different virtual biopsies to ensure a stable measurement compared to different medical imaging systems and different methods of virtual biopsy generation.

A further goal is to enhance and make available to the physician a variety of information originally contained in medical images in standard format.

A further purpose of the invention is to avoid, or at least significantly reduce, the use of real contrast media.

These goals are achieved by a method as described in the present invention.

For a better understanding of the invention, it should be noted, however, that in the context of this description and of the enclosed drawings, the tam "virtual biopsy" is used solely as a metaphor to indicate the action of extracting, from medical or veterinary images of the body, of an organ or any other human or animal body structure or part, portions of images representing tissue partitions, or tissue functions, on which to perform analysis in order to characterize such tissue partitions or tissue functions.

This has the consequence that with the term "virtual biopsy" in this description, no action is represented that involves any real physical removal of any portion or fragment of tissue either in man or animal.

Rather with the team "virtual biopsy" associated with tissues (and/or tissue functions) of organs or any other structure or body part, in the presence or absence of pathology, it is meant a complex of processing carried out on original medical or veterinary images, where such processing is designed to make recognizable, by one or more computers, or by a human operator, significant characteristics implicitly present in the original images.

These elaborations, as better illustrated below, operate as digital surrogates of new biopsies, measuring levels of expression of their architectural, morphological and functional complexity not appreciable to the naked eye.

The images can be in a standard medical format and can be three-dimensional (3D) or two-dimensional (2D) images.

Moreover, in the present description the team "virtual contrast medium" is used as metaphor to represent the concept to simulate an administration finalized to visualize, on said defined virtual biopsy, the results of the elaborations.

The consequence of this is that the tam "virtual contrast medium" does not represent any action involving any real physical administration of any biochemical agent either in humans or animals. Rather with the team "virtual contrast medium" it will be understood in the present description the result of elaborations carried out by means of computers or networks of computers on medical or veterinary images, said elaborations being finalized to associate to such images numerical values representative of the intensity of expression of a determined characteristic in such a way that it is interpretable from a computer, a network of computers or a human operator.

The invention has as its object a method for the generation of models to automatically classify in at least one class of interest medical or veterinary images derived from original images, where said method is implemented by means of computers or computer networks and wherein said method includes at least the following steps:

selection of at least one class of interest;
construction of a database containing a plurality of data structures representative of derived medical or veterinary images, said data structures being generated by processing of original medical or veterinary images, wherein said data structures are processed in such a way that they can be used as a surrogate for real biopsies performed with real contrast media,
association to the classes of interest of said data structures that can be used as a surrogate for real biopsies performed with real contrast media;
training of at least one model using said data structures in order to train said model, on the basis of the differences in the levels of expression of characteristics highlighted in said data structures, to classify each of said derived images in one or more classes of interest.

Among the advantages of this embodiment is the fact that the models produced by the invention can be used as automatic predictive models of virtual biopsy image classes.

The expression levels selected by the automatic classifiers can be used as predictors of virtual biopsy image classes, which can be displayed using virtual contrast media.

One aspect of the invention provides for, in order to generate derived medical or veterinary images that can be used as a surrogate for real biopsies pertained with real contrast media, at least the following steps:

receive at least one original medical or veterinary image, wherein the original medical or veterinary image is represented by an original data structure in a standard medical or veterinary format;
partition said image into classes of interest, said classes of interest being representative of different tissues or tissue functions of one or more body organs;
generate from each of said classes of interest a corresponding derived data structure that can be stored in a standard medical or veterinary format, where the derived data structure contains data representative of tissue intensity values or function of the partitioned tissue;
generate for each of said derived data structures a plurality of variants (N) by combined manipulations of the original and representative medical or veterinary image data structure and the derived data structure, by means of operations chosen from statistical elaborations, rotations, translations and rototranslations of medical or veterinary images and elastic and inelastic defamations of the partition or partitions representative of different tissues or functions of tissues of one or more body organs;

measure, for each of the variants of the generated plurality of variants (N), corresponding levels of expression of the characteristics of the tissue or the function of the tissue expressing local differentiations in the micro-architecture of the tissue or in the functional signal of the tissue, irregularities in the shape and anomalies in the size of the tissue or combinations or elaborations of these characteristics;

extract a plurality of statistical measurements from a co-occurrence matrix of the histogram of image oriented gradients;

generate a data structure aimed at making recognizable by the computer or computer network significant characteristics implicitly present in the original images, by association of a numerical value to each characteristic, said numerical value being representative of the level of intensity of expression of said characteristic.

More in detail, the method of the invention is able to generate predictive models to automatically classify in at least one class of interest medical or veterinary images derived from original images, wherein said derivation is finalized to make detectable to a computer and to a human operator, predictive characteristics, implicitly present in the original images, not perceivable by the naked eye, making them visible and interpretable to the naked eye on images derived, wherein said method is implemented by means of computers or of computer networks and wherein said method includes at least the following steps:

selection of at least one class of interest wherein the classes of interest characterize predictions;

construction of a database containing a plurality of data structures representative of derived medical or veterinary images, said data structures being generated by processing original medical or veterinary images, in order to extract portions of images representing tissue partitions or tissue functions, wherein said data structures representative of derived medical or veterinary images are further processed by measuring levels of expression of characteristics implicitly present in the original and derived images that are not perceivable by the naked eye, said characteristics expressing local differences in the micro-architecture of the tissue or in the functional signal of the partitioned tissue, irregularities in the shape and anomalies in the size of the partitioned tissue or combinations or elaborations of these characteristics, so that they can be used as characteristics expressing the architectural, morphological and functional complexity of the tissue partitions, in order to characterize these tissue partitions or tissue functions and usable for surrogate of real biopsy;

association to said classes of interest of said processed data structures;

training of at least one predictive model using said data structures elaborated in such a way to train said model to classify each of said data structures in one or more of said classes of interest on the basis of the differences in the distribution of the levels of expression of characteristics measured in said data structures, wherein the statistically significant predictive characteristics of the model are the characteristics resulting from testing their probability of not being random predictors of the model.

According to an embodiment of the present invention, the processing steps of the data structures representative of original medical or veterinary images finalized to making significant characteristics implicitly present in the original medical or veterinary images to make said derived images usable, includes at least the following:

receive at least one original medical or veterinary image, wherein said original medical or veterinary image is represented by an original data structure in a standard medical or veterinary format;

partition said image into classes of interest, said classes of interest being representative of different tissues or functions of tissues of body organs;

generate from each of said classes of interest a corresponding derived data structure that can be stored in a standard medical or veterinary format, wherein the derived data structure contains data representative of tissue intensity values or function of the partitioned tissue;

generate for each of said derived data structures a plurality of variants (N) by means of combined manipulations of the original data structure, representative of the original medical or veterinary image, and the derived data structure, processed in order to generate a second binary data structure, derived from the previous one, which defines the volume of the partition, obtained by setting to 1 the internal intensity values of the extracted partition and by setting to zero the external intensity values, wherein said variants are generated by means of operations chosen between statistical elaborations, rotations, translations and rototranslations of the images, elastic and inelastic deformations of the volumes, the variants being generated by inducing variations in the intensity values of the original images similar to the variations obtained by acquiring the same image in repeated measurements under conditions of environmental perturbations, and variations in the volumes similar to the variations obtained by different image partitioning methods;

measure, for each of the variants of the generated plurality of variants (N), corresponding levels of expression of the characteristics of the tissue or the function of the tissue expressing local differentiations in the micro-architecture of the tissue or in the functional signal of the tissue, irregularities in the shape and anomalies in the size of the tissue or combinations or elaborations of these characteristics;

said measurement being made by extracting a plurality of statistical measurements from a co-occurrence matrix of the histogram of the image oriented gradients;

assign to each measured characteristic a stability index, calculated as an intra-class correlation coefficient between the expression levels for that characteristic in the 1+N variants generated;

generate a data structure finalized to make recognizable by the computer or by the network of computers significant characteristics implicitly present in the original images, by means of association of a numerical value to every stable characteristic having said stability index greater than a predetermined numerical value, said numerical value being representative of the level of intensity of expression of said characteristic.

Further characteristics of the invention can be inferred from the employee claims.

BRIEF DESCRIPTION OF THE FIGURES

Further characteristics and advantages of the invention will be apparent from reading the following description provided by way of non-limiting example, with the aid of the figures illustrated in the enclosed tables, in which:

FIGS. 4a and 4b illustrate examples of original PET-CT medical images of lung tissue used in a first example of the invention method;

FIGS. 4c and 4d illustrate color examples of five different characteristics C1, C2, C3, C4 and C5 extrapolated from a first example of the method of the invention and respectively related to the tissues of images 4a and 4b;

FIG. 6a illustrates an example of selection of classes of interest and FIG. 6b illustrates in color an example of association of virtual biopsies with virtual contrast media to the selected classes;

FIG. 6c illustrates an example of a first model of image classification to train according to an embodiment of the invention and FIG. 6d is a block diagram of some steps of the method of generation of predictive models of the invention;

FIG. 6e illustrates in color as an example, the most predictive characteristics identified by the generated model;

FIGS. 7a and 7b illustrate examples of original MRI medical images of brain neurodegeneration used in a second example of the invention method;

FIGS. 7c and 7d illustrate color examples of four different characteristics C1, C2, C3 and C4 extrapolated in a second example of the invention method and related to the tissues of images 7a and 7b respectively;

FIG. 8a illustrates a second example of selection of classes of interest and FIG. 8b illustrates in color a second example of association of virtual biopsies with virtual contrast media to the selected classes;

FIG. 8c illustrates an example of a second model of image classification to be trained according to an embodiment of the invention and FIG. 8d is a block diagram of some steps of the method of generation of predictive models of the invention; and FIG. 8e illustrates in color as an example, the characteristics with greater predictivity identified by the second generated model.

DETAILED DESCRIPTION OF THE INVENTION

The present invention will now be described with particular reference to the enclosed figures.

Figure 1:
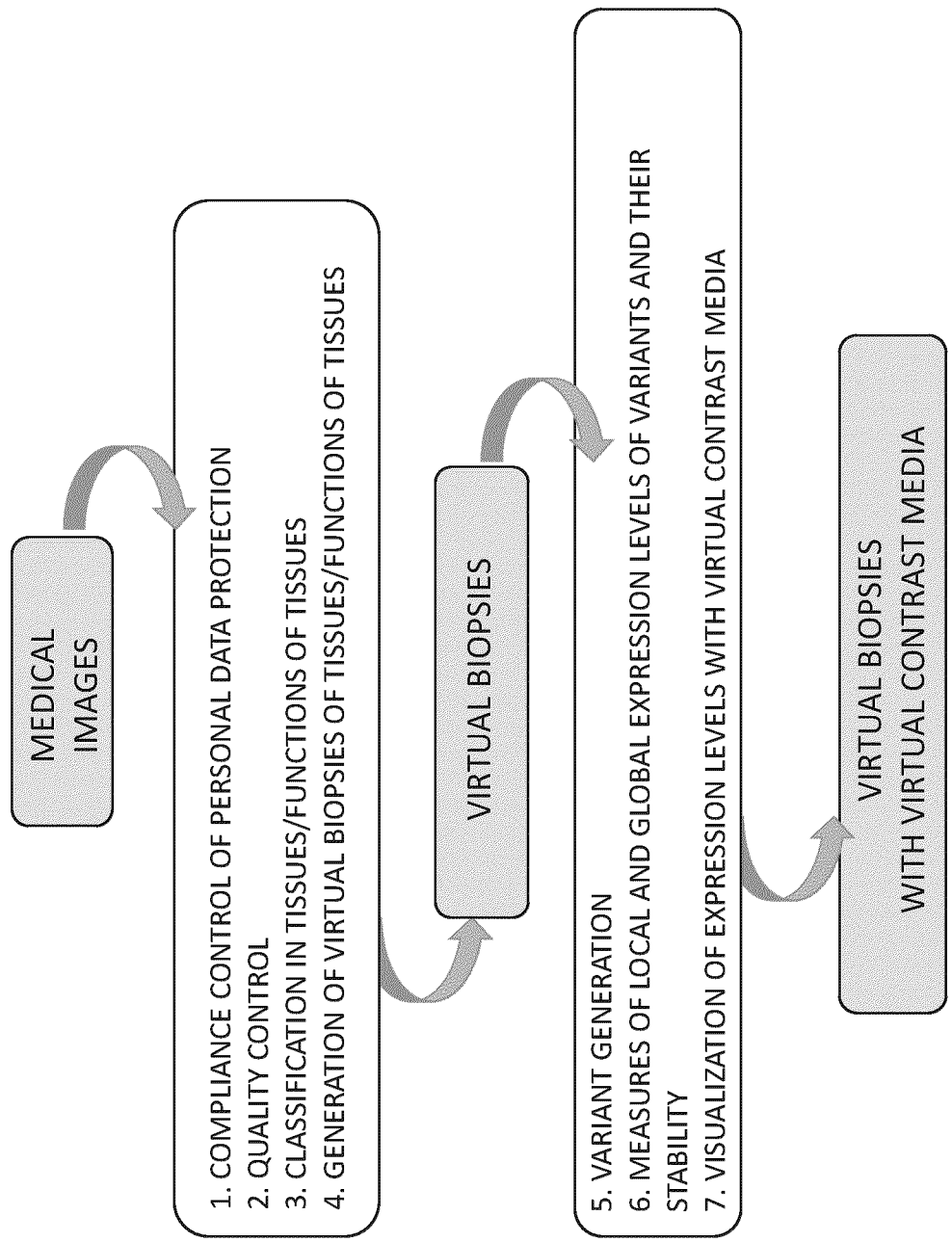
FIG. 1 is a block diagram that illustrates the main steps at the base of the generation of a virtual biopsy with virtual contrast media, according to an embodiment of the invention.

In particular, FIG. 1 shows the main steps at the base of the generation of a virtual biopsy with virtual contrast media, according to an embodiment of the invention.

The medical images referred to in FIG. 1 and from which the virtual biopsy is generated are obtained by the known techniques CT, MRI, optionally, also following the administration of a contrast medium with biochemical agents, and by the known techniques PET and SPECT, in every way of image acquisition and reconstruction, made possible by said technologies, which allow the image reconstruction of tissues (and/or tissue functions) of organs or any other structure or body part, in the presence or absence of pathology. Among the acquisition modes for PET are included: static or dynamic acquisition modes following the administration of any radiopharmaceutical; for MR: structural, functional, diffusion, perfusion, magnetic susceptibility, angiography acquisition modes; optionally in combination with each other, in single mode or in modes already integrated during the image acquisition phase (hybrid systems, including: PET-TC, SPECT-TC, PET-SPECT, PET-MRI).

The method according to the various embodiments of the invention uses any data structure containing numerical formats of medical images, including data structures consisting of one or more "headers" and of 2D matrices of numbers in binary format that define the 2D or 3D image of a human or animal subject as a succession of images whose technical and procedural information related to the human or animal subject (e.g. weight and height and any dose and residue of radiopharmaceutical or real contrast medium administered), and the acquisition and reconstruction of its images, are described in the "header" or associated "headers".

These data structures are available in several standard formats known for medical imaging, in particular DICOM (Digital Imaging and Communications in Medicine) and NIFTI (Neuroimaging Informatics Technology Initiative) formats, at local PACS (Picture Archiving and Communication System) repositories of hospital and research facilities acquiring diagnostic imaging studies and at other repositories, including distributed repositories supporting such formats.

A first step of the method is indicated in FIG. 1 (step 1) with the expression Personal data protection compliance control and concerns the deletion of data that allow the direct identification of the subject (including personal data) and electronic communication data (including e-mail, telephone), data that are not used by the method described in the invention. This process can be carried out by means of various known methods, to ensure the compliance of data processing with national and international regulations on the protection of personal data, for example, by directly deleting such data in the header of the data structure. A second step indicated in FIG. 1 as step 2, that is Quality Control, concerns the control of the completeness of the data structure associated with medical or veterinary images. The number of images, the sequence of images with respect to the number and sequence indicated in the header and the size of the image data structures are checked. In the case of PET images, the presence of the dose data and the radiopharmaceutical residue administered and the time of administration, necessary to measure the image data in Standardized Uptake Value (SUV) units, is checked.

A third step (FIG. 1, step 3—Classification in tissues/tissue functions) is the step that allows to partition medical or veterinary images into multiple classes of tissues (and/or tissue functions) of organs or any other structure or body part, in the presence or absence of pathology, on which to virtually mimic a biopsy by simulating the action of extracting, from medical or veterinary images, portions of images representing a tissue partition, or tissue function, on which to perform analysis in order to characterize said tissue partition or tissue function.

Among the automatic classification procedures can be used, optionally, not exhaustively, threshold algorithms, also adaptive, supervised classification algorithms (e.g. minimum distance, maximum likelihood, Bayesian estimators, Markov fields, machine learning algorithms such as deep neural networks, convolutional neural networks), unsupervised classification algorithms (e.g. k-means, Bayesian estimators without ground-truth, kernel-based density estimators, various types of autoencoders), and object-oriented classification algorithms (e.g. edge detection by gradient, Laplacian operators, oriented operators, Roberts operators, Previt, Sobel, watershed algorithms).

Alternatively and optionally, the partitioning of the medical or veterinary image into multiple classes of tissues (and/or tissue functions) of organs or any other structure or body part, in the presence or absence of pathology, can be performed by an experienced operator by means of the use of tools with dedicated graphical interfaces, either by manually contouring the classes of interest on medical or veterinary images or by manually editing the contours of the automatically classified classes.

A fourth step (FIG. 1, step 4) is the Generation of virtual tissue biopsy/tissue function, i.e. the process of generating the virtual biopsy of a tissue/tissue function. For each class of tissue/tissue function partitioned in medical or veterinary images, a data structure is generated in the same standard format as the medical images from which it is derived, i.e. a derived image is generated, with the intensity values of the partitioned tissue/tissue function, and a record is generated that includes this data structure.

In particular in FIG. 4a is visible a first example consisting of an original PET/CD 200 image from which a first detail is extracted, that is an image of a metabolically active lung tissue 210, where said image is subjected to the steps of the method of the invention.

In particular in FIG. 4b it is visible a second example consisting of an original PET/CD 210 image from which a second detail is extracted, that is an image of a lung tissue of increased density 210', where also this image is subjected to the steps of the method of the invention.

The fifth step of the method (FIG. 1, step 5—Variant Generation) is the process that guarantees a reliable and robust analysis of virtual biopsies. For every original image (for example the images 210 and 210' of the FIGS. 4a and 4b) N variants are generated starting from the original partitioned one, up to some hundred, by means of a series of manipulations of the image of the original virtual biopsy (created by means of the step 4) and of a second binary image (0-1), derived from the previous one, called "mask", obtained setting to zero the values of intensity of the image of the virtual biopsy external to the contour and putting to 1 the values of intensity internal to the contour. The generated variants induce variations in the intensity values of the virtual biopsy image data structures that simulate measurements of repeated biopsies over time and biopsies virtually generated by different classification methods, including different manual contours or manual changes of contours obtained by automatic classification. For this purpose, rotations, translations, rototranslations of virtual biopsy images and rotations, translations, rototranslations and elastic and inelastic defamations of binary contour masks can be performed.

Figure 5B:
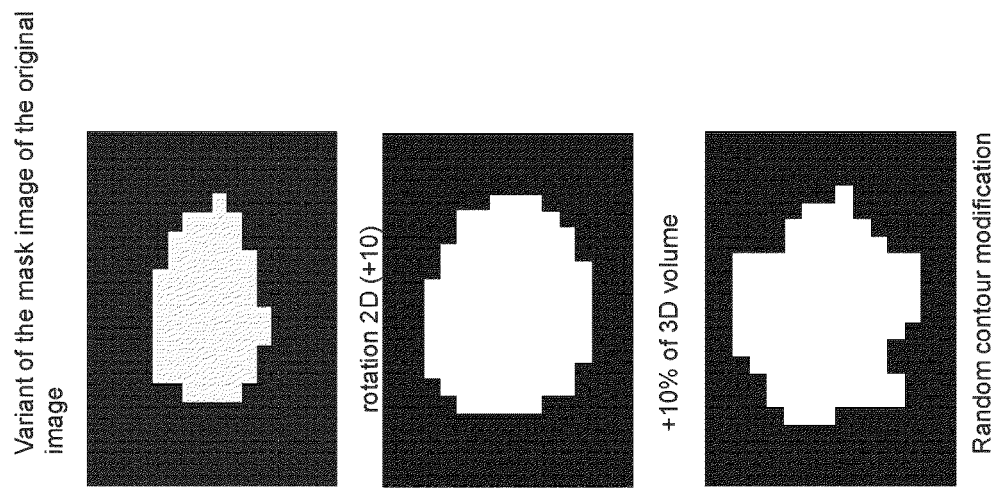
FIGS. 5a and 5b illustrate examples of implementation of step 5 of FIG. 1 of the method in the case of medical PET-CT images of lung tissue.
Figure 5A:
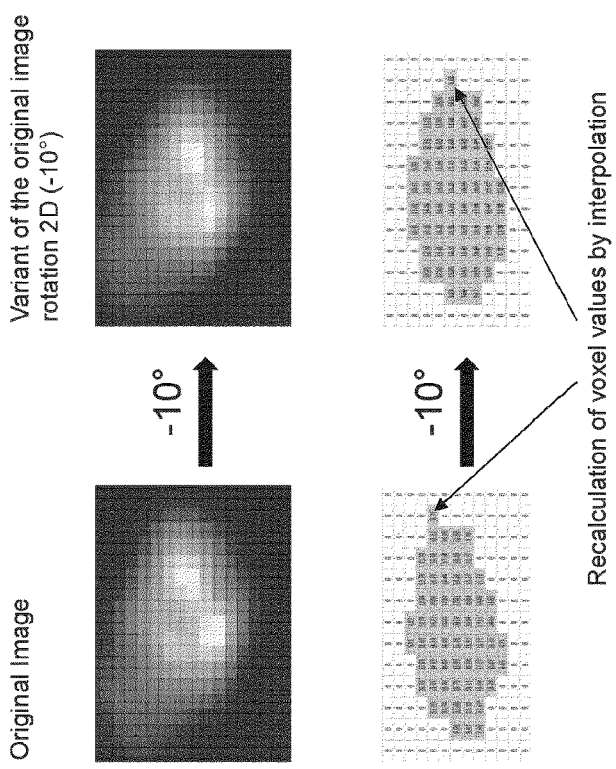

In particular in FIG. 5a it is visible, as an example, one of the many possible manipulations of the original image, i.e. a rotation of the same by an angle of −10° for which a recalculation of the voxel values of said image is performed by interpolation.

FIG. 5b shows, as an example, some manipulations of the mask image of the original image, i.e. a +10° rotation, a 10% volume increase and a random modification of the contour.

A sixth step (FIG. 1, step 6—Measurements of local and global expression levels of variants and their stability) is the process of measuring the levels of expression of tissue characteristics, or tissue function, suitable to express, for example, local differentiations in the micro-architecture of the tissue or in the functional signal of the tissue, irregularities in the shape and anomalies in the size of the tissue, or suitable to express in a simplified way, their complexity.

For the original image and for each of these variants (1+N), local and global expression levels of a multiplicity of characteristics (up to a few thousand) are measured.

For this purpose, a series of statistical measurements are extracted from the histogram of oriented gradients, in particular from the co-occurrence matrix of the image oriented gradient histogram. Among the characteristics that can be measured, optionally, but not exhaustively, there are also: signal intensity levels, measurements derived from their gradients, statistical measurements obtained from their distributions, morphological measurements, statistical measurements obtained from the histogram of intensities, weaving measurements obtained by means of statistical methods of the second order. It is also possible to measure, optionally, not exhaustively, measurements obtained by convolutions with Gabor filters.

It is also possible to measure optionally, not exhaustively, characteristics extracted by filtering techniques with the use of different filters, among which, for example, exponential, logarithmic, laplacian, gaussian filters.

In addition, characteristics extracted by analysis of the main components (PCA) or by analysis of the partial least squares (PLS) can be optionally measured.

Optionally, not exhaustively, characteristics extracted from convolutional neural networks or other machine learning and deep learning algorithms can also be measured.

To each measured characteristic is assigned a stability index, for example in tams of intra-class correlation coefficient (ICC), obtained by comparing the results of expression levels obtained for that characteristic in the 1+N virtual biopsies generated.

For example, in FIG. 4c five different characteristics C1, C2, C3, C4 and C5 are illustrated in color and are related to the metabolically active lung tissue 210 of FIG. 4:
Characteristic 1-C1
Gradient intensity=0.7; ICC=0.5
Characteristic 2-C2
Gradient angle=0.7; ICC=0.8
Characteristic 3-C3
Absolute energy based on intensity statistics=0.4; ICC=0.9
Characteristic 4-C4
Absolute variance based on intensity statistics=0.2; ICC=0.9
Characteristic 5-C5
Non-uniformity in the size of the areas defined by the gray levels =0.1; ICC=0.8.

As a further example, in FIG. 4d the same five different characteristics C1, C2, C3, C4 and C5 are illustrated in color and related to the lung tissue of increased density 210' of FIG. 4b, which will naturally assume different values in general, in particular:
Characteristic 1-C1
Gradient intensity=0.3; ICC=0.6
Characteristic 2-C2
Gradient angle=0.2; ICC=0.7
Characteristic 3-C3
Absolute energy based on intensity statistics=0.4; ICC=0.9

Characteristic 4-C4
Absolute variance based on intensity statistics=0.7; ICC=0.8
Characteristic 5-C5
Non-uniformity in the size of the areas defined by the gray levels=0.4; ICC=0.9.

A seventh step (FIG. 1, step 7—Visualization of stable expression levels with virtual contrast media) is the process of visualization of expression levels on virtual biopsies using virtual contrast media.

To each expression level is associated a virtual contrast medium that "colors" the characteristic expressed according to its normalized level, as for example indicated by the colors of the FIGS. 4c and 4d. Such scale of colors makes appreciable to the human eye the variations of the single characteristics expressed at local level.

For each virtual biopsy generated and analyzed, the method provides a data structure that includes, in particular, the results of the measurements, in tams of expression levels of the measured characteristics and related ICC, and the digital images of the virtual biopsy with specific virtual contrast media to make the expression levels visible.

The data structures generated by the image processing process underlying the invention are proposed as a new image mode, i.e. as surrogates for contrast media for diagnostic imaging techniques. The method also allows the training and generation of new automatic predictive models for the classification of virtual biopsy images and the identification of predictors of the classes measured by means of virtual biopsies.

Figure 2:
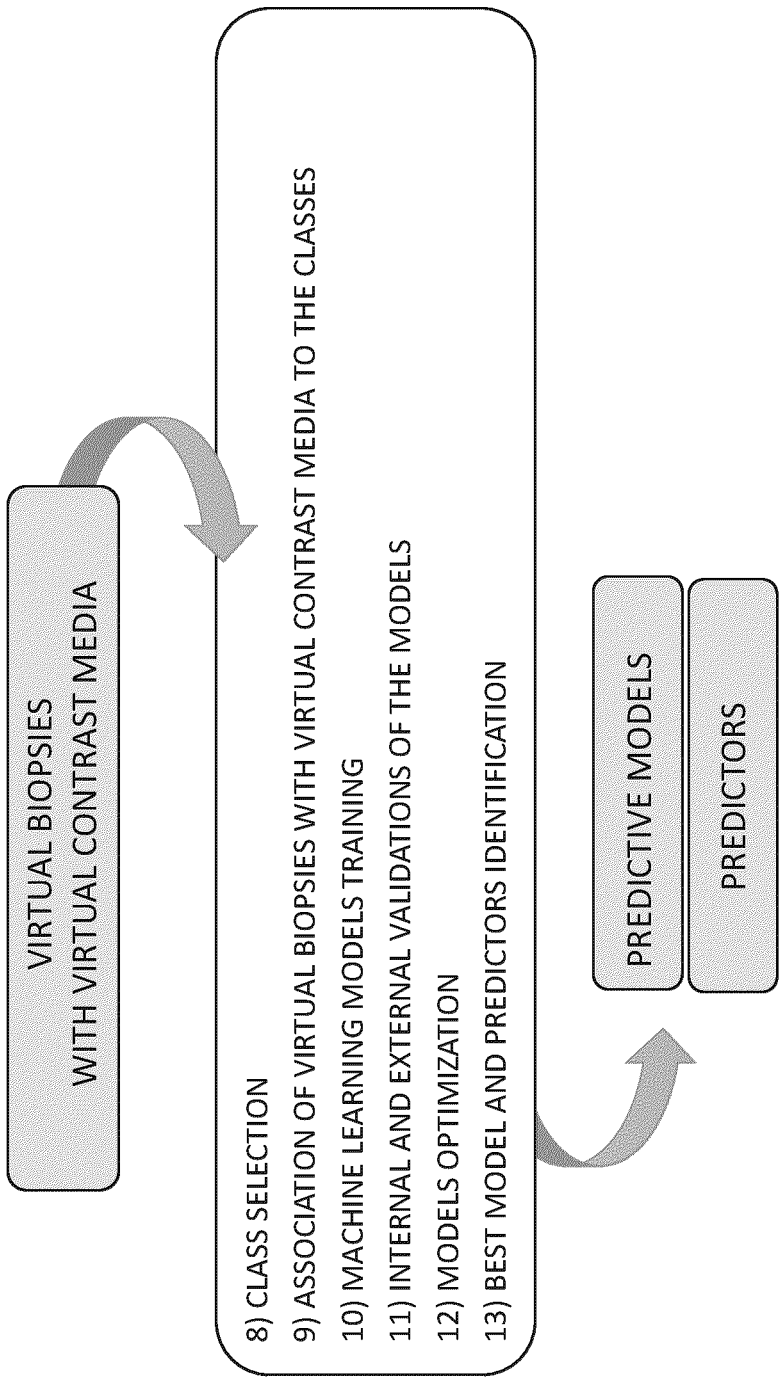
FIG. 2 is a block diagram that illustrates the main steps at the base of the generation of an automatic predictive model trained on the levels of expression measured by virtual biopsies with virtual contrast media of different classes and identification of predictors, according to a further aspect of the invention.

FIG. 2 shows the main steps for the generation of an automatic predictive model trained in a supervised way on the expression levels measured by virtual biopsies with virtual contrast media of different classes.

The initial step of the generation phase of a supervised automatic predictive model is indicated in FIG. 2 as step 8, i.e. supervised class selection. It consists in the selection of the different classes of interest in order to generate the specific predictive model of classification of the virtual biopsies with virtual contrasts in such classes of interest.

For example, FIG. 6a shows the selection of two (or more) classes. This selection can be made in supervised or unsupervised mode. It can be selected, alternatively, not exhaustively: only one class of interest (in which case the model is associated to the category "unsupervised classifier" or "anomaly detection" or "one class classifier"), two classes of interest (in which case the model is associated to the category "binary classifiers"), more than two classes of interest (in which case the model is associated to the category "multi-group classifier").

The next step (FIG. 2, step 9—Association of virtual biopsies with virtual contrast media to classes) consists in associating to each class of interest, selected in the previous process, the corresponding data structure containing the results of the analysis (expression levels) of virtual biopsies with virtual contrast media. At the end of this process, each of the k classes of interest will be characterized by a number n(k) of data structures of virtual biopsies with virtual contrast media.

This phase is also shown schematically in FIG. 6b.

The next step (FIG. 2, step 10—Supervised training of machine learning models) consists in training one or more models using the n(k) data structures with the expression levels of the characteristics extracted from the virtual biopsies belonging to the classes (or class) of interest defined previously.

During this process, one or a set of machine learning algorithms learns, in a supervised or unsupervised way, to separate images of virtual biopsies based on the differences in their expression levels and, subsequently, to classify new virtual biopsies (not used in the training phase) in the classes of interest based on expression levels. Among the supervised learning algorithms can be used, optionally, not exclusively, machine learning algorithms such as Support Vector Machine, Decision Trees, Random Forest, Neural Networks, Convolutional Neural Networks or, more generally, Deep Learning, Linear Regression or Logistics. Among the unsupervised learning algorithms can be used optionally, not exclusively, clustering algorithms, including k-means and hierarchical clustering.

Some sub-processes are carried out with the aim, optionally, not exhaustively, to select the expression levels to be used for the training of the models, in particular:
1) harmonizing the expression levels measured using different medical image acquisition protocols or different systems or acquired in different centers: this sub-process can be performed, optionally, not exhaustively, using techniques to harmonize the averages or medians of the measured expression levels distributions using different image acquisition protocols or different systems or acquired in different centers;
2) extracting the statistically independent characteristics, with greater variance between the classes of interest: this sub-process can be performed, optionally, not exhaustively, using multivariate techniques such as PCA, PLS, or independent component analysis;
3) selecting, among the characteristics extracted in the previous points, the most significant ones from a statistical point of view for the differentiation of classes of interest: this sub-process can be performed, optionally, not exhaustively, using univariate techniques such as Fisher Discriminant Ratio (FDR), Student t-test, Pearson test.

This phase is also illustrated schematically in FIG. 6c, in which a three-dimensional graph is represented that defines an abstract space determined by the values of the characteristics C3, C4 and C5.

For example a generated model could have equation $Y_1=1.18X_1+1.24X_2+0.85$, where $Y_1$ represents characteristic 3, where $X_1$ represents characteristic 4 and $X_2$ represents characteristic 5.

These values, which define the equation of a plane that separates the abstract space into two regions, are purely illustrative and not limiting the characteristics of the invention.

It is also obvious that in the method of invention, depending on the applications, abstract spaces with n-dimensions, with n greater than 3, can be considered.

FIG. 6d summarizes the following steps 11, 12 and 13 of the method of the invention.

The next 11th step (FIG. 2, step 11—Internal and external model validation) consists in measuring the performance of the model(s), based on the comparison of figures of merit that estimate the errors of the model(s), and therefore the related predictive capabilities, in tams of, for example, Accuracy, Sensitivity, Specificity, Area under the Curve-AUC, predictive value of true positives, predictive value of true negatives, F1 score, obtained in the classification of virtual biopsy images derived from medical or veterinary images acquired non-independently (internal validations) and independently (external validations) with respect to the medical images from which the virtual biopsies used to train the model(s) were derived.

For example, the equation $Y_1=1.18X_1+1.24X_2+0.85$ might have internal AUC=0.88 and external AUC=0.85.

A 12-th step (FIG. 2, step 12—Optimization of the models) represents the phase of optimization and improvement of the model(s), that happens repeating the steps 10 and 11 in an iterative way, with the addition of other samples of images of virtual biopsies, and/or other characteristics that can improve the model: as an example, other images of virtual biopsies with virtual contrast media and/or other data of interest for image classes, such as levels of tissue expression and or tissue functions of characteristics measured with other medical techniques, including homic methodologies, or factors that may have played a role in tissue formation and/or tissue functions). During these phases, several models are generated and validated (internally and externally) that respond to the task of classifying virtual biopsies into classes of interest and their performance is measured.

This passage could happen, as an example, modifying the previous equation progressively until arriving to the 13th and last step, that is (FIG. 2—step 13), the identification of the best model and predictors).

It is therefore further provided a phase of choice of the best model and its predictors, on the basis of the comparison of the figures of merit of the predictive capabilities of the different classifier models obtained.

In the example above, the best model could have equation $Y_1=1.16X_1+1.24X_2+0.86$ could have internal AUC=0.92 and external AUC=0.88.

For each automatic predictive model generated, the method provides a data structure that includes, in particular,
the model functions and parameters of the model functions that predicted the classes of interest of virtual biopsy images with virtual contrast media,
figures of merit of the predictive capacity of the model,
the list of contrast characteristics with greater predictivity identified by each model starting from the virtual biopsies with virtual contrast media, in FIG. 6e the characteristics C3, C4 and C5 have been illustrated as an example.

For each classified virtual biopsy image, the method provides a figure of merit of the probability that such image belongs to the class predicted by each model.

A further example is visible in FIG. 7a, in which is represented an original medical image 300 from which is extracted a first detail, or an original image of gray brain substance 310 and a second detail or an original image of white brain substance 310' (FIG. 7b), where these images are subjected to the steps of the invention method.

Similarly to the previous example, in FIG. 7c four different characteristics C1, C2, C3 and C4 are illustrated, exemplifying the grey brain matter 310 in FIG. 7a.

In particular, in the proposed example, in particular following a PCA, we have that:
Characteristic 1-C1
PCA 1=−87.12; ICC=0.9
Characteristic 2-C2
PCA 2=121.90; ICC=0.4
Characteristic 3-C3
PCA 3=14.56; ICC=0.8
Characteristic 4-C4
PCA 4=−323.34; ICC=0.6

In FIG. 7d four different characteristics C1, C2, C3 and C4 are illustrated, exemplifying the 310' white brain matter in FIG. 7b.

In particular, in the proposed example, we have that:
Characteristic 1-C1
PCA 1=−163.47; ICC=0.8
Characteristic 2-C2
PCA 2=24.19; ICC=0.5
Characteristic 3-C3
PCA 3=−7.94; ICC=0.8
Characteristic 4-C4
PCA 4=12.21; ICC=0.8

The method continues with the steps described for the previous case, i.e. FIG. 8a illustrates the selection of two (or more) classes that can be carried out in supervised or unsupervised mode FIG. 8b shows schematically the association to each class of interest of a corresponding data structure containing the results of the analysis (expression levels) of virtual biopsies with virtual contrasts.

In FIG. 8c, a three-dimensional graph is represented that defines an abstract space determined by the values of the characteristics C1, C2 and C3.

For example a generated model could have equation $y_1=1.21x_1+1.20x_2+0.85$, where $Y_1$ represents characteristic 3, where $X_1$ represents characteristic 2 and $X_2$ represents characteristic 1.

These values are purely illustrative and not limiting the characteristics of the invention.

FIG. 8d summarizes the following steps 11, 12 and 13 of the invention method, similar to those previously described.

Finally, FIG. 8e summarizes the contrast characteristics with greater predictivity identified by this particular model starting from virtual biopsies with virtual contrast media that, as an example, are the C1 and C3 characteristics.

The method can be implemented as a computer system or a computer product, such as a software or software suite, recorded in a computer-readable storage device, or installed in a stand-alone or cloud platform or other platform, accessible both locally and remotely by means of appropriate hardware and software configuration and in accordance with national and international regulations governing the protection of personal data.

Figure 3B:
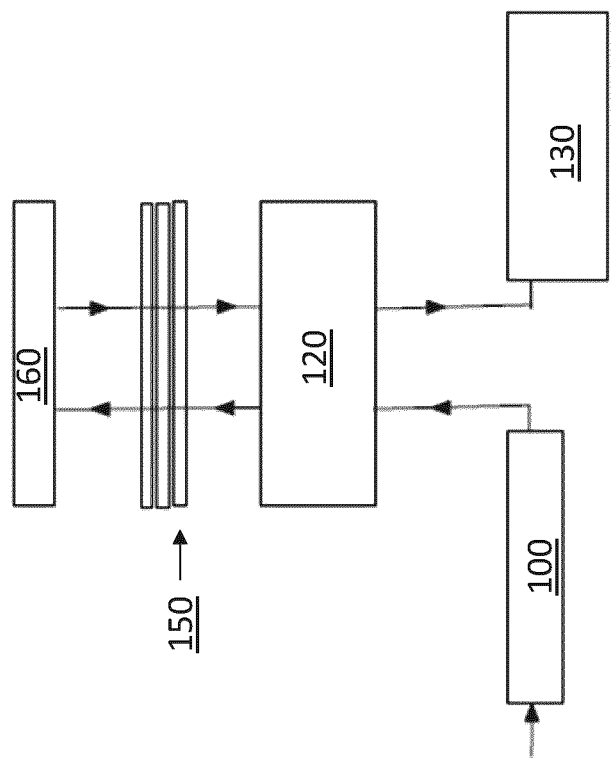
FIG. 3a shows an example of method implementation in a system using a local platform and FIG. 3b shows an example of method implementation using a cloud platform.
Figure 3A:
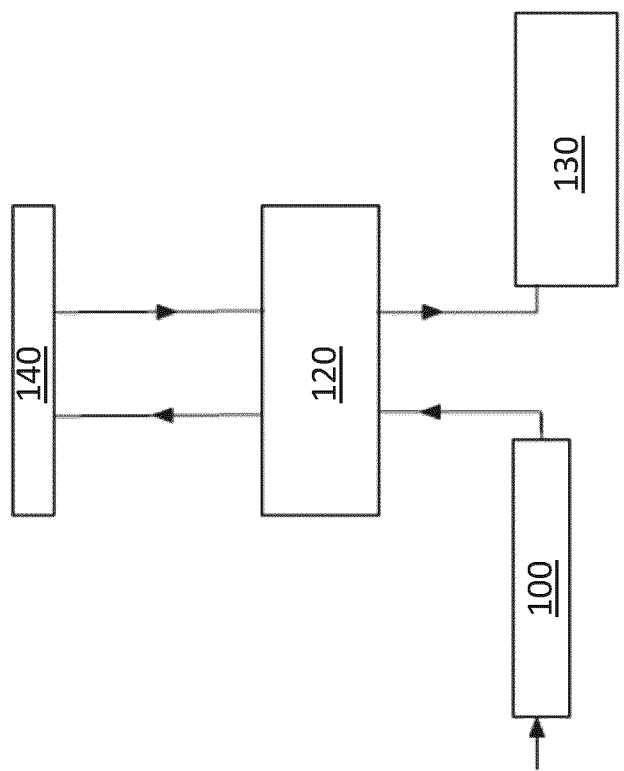

Examples of computer systems configured to implement the invention method are shown in FIGS. 3a and 3b.

FIG. 3a illustrates an example of method implementation in a system using a local platform.

In this implementation, medical or veterinary images (block 100) are received and visible on a local user interface (block 120).

The representative data structures of these images are sent to an algorithm that works on a local hardware platform (block 140) and following this processing, which takes place in the manner described in this description, these images are processed and received as output in the form of virtual biopsies with virtual contrast media, in the manner described in this description (block 130).

FIG. 3b shows an example of method implementation in a system using a cloud platform (block 150).

In this implementation, medical or veterinary images (block 100) are received and visible on a local user interface (block 120).

The representative data structures of these images are sent to an algorithm that works on remote hardware platforms (block 160) and as a result of this processing, these images are processed and received as output in the form of virtual biopsies with virtual contrast media, according to the modalities described in this description (block 130).

Obviously to the invention as described can be made modifications or improvements dictated by contingent or particular motivations, without departing from the scope of the invention.

The invention claimed is:

1. A method for the generation of predictive models to automatically classify in at least one class of interest medical or veterinary images derived from original images, wherein said derivation is finalized to make detectable to a computer and to a human operator, predictive characteristics, implicitly present in the original images, not perceivable by the naked eye, making them visible and interpretable to the naked eye on images derived, wherein said method is implemented by means of computers or of computer networks and wherein said method comprises:

selecting at least one class of interest wherein classes of interest characterize predictions;

constructing a database containing a plurality of data structures representative of derived medical or veterinary images, said data structures being generated by processing original medical or veterinary images, in order to extract portions of images representing tissue partitions or tissue functions, wherein said data structures representative of derived medical or veterinary images are further processed by measuring levels of expression of characteristics implicitly present in the original and derived images that are not perceivable by the naked eye, said characteristics expressing local differences in the micro-architecture of the tissue or in the functional signal of the partitioned tissue, irregularities in the shape and anomalies in the size of the partitioned tissue or combinations or elaborations of these characteristics, so that they can be used as characteristics expressing the architectural, morphological and functional complexity of the tissue partitions, in order to characterize these tissue partitions or tissue functions and usable for surrogate of real biopsy;

associating to said classes of interest the corresponding processed data structures; and training of at least one predictive model using said data structures elaborated in such a way to train said model to classify each of said data structures in one or more of said classes of interest on the basis of differences in the distribution of the levels of expression of characteristics measured in said data structures, wherein statistically significant predictive characteristics of the model are the characteristics resulting from testing their probability of not being random predictors of the model;

wherein the processing step of the data structures representative of original medical or veterinary images finalized to make significant characteristics implicitly present in the original medical or veterinary images to make said derived images usable, includes the following phases:

receiving at least one original medical or veterinary image, wherein said original medical or veterinary image is represented by an original data structure in a standard medical or veterinary format;

partitioning said image into classes of interest, said classes of interest being representative of different tissues or functions of tissues of body organs;

generating from each of said classes of interest a corresponding derived data structure that can be stored in a standard medical or veterinary format, wherein the derived data structure contains data representative of tissue intensity values or function of the partitioned tissue;

generating for each of said derived data structures a plurality of variants (N) by means of combined manipulations of the original data structure, representative of the original medical or veterinary image, and the derived data structure, processed in order to generate a second binary data structure, derived from the previous one, which defines the volume of the partition, obtained by setting to 1 the internal intensity values of the extracted partition and setting to zero the external intensity values, wherein said variants are generated by means of operations chosen between statistical elaborations, rotations, translations and rototranslations of the images, elastic and inelastic deformations of the volumes, the variants being generated by inducing variations in the intensity values of the original images similar to the variations obtained by acquiring the same image in repeated measurements under conditions of environmental perturbations, and variations in the volumes similar to the variations obtained by different image partitioning methods;

measuring, for each of the variants of the generated plurality of variants (N), corresponding levels of expression of the characteristics of the tissue or the function of the tissue expressing local differentiations in the micro-architecture of the tissue or in the functional signal of the tissue, irregularities in the shape and anomalies in the size of the tissue or combinations or elaborations of these characteristics;

said measuring being made by extracting a plurality of statistical measurements from a co-occurrence matrix of the histogram of the image oriented gradients;

assigning to each measured characteristic a stability index, calculated as an intra-class correlation coefficient between the expression levels for that characteristic in the 1+N variants generated; and generating a data structure finalized to make recognizable by the computer or by the network of computers statistically significant predictive characteristics implicitly present in the original images, by means of association of a numerical value to every stable characteristic having said stability index greater than a predetermined numerical value, said numerical value being representative of the level of intensity of expression of said characteristic.

2. The method according to claim 1, wherein among the characteristics that can be measured there are levels of signal intensity, statistical measurements obtained from their distributions, morphological measurements, statistical measurements obtained from the histogram of intensities, texture measurements obtained by statistical methods of the second order, measurements obtained by convolutions with Gabor filters or combinations of these techniques.

3. The method according to claim 1, wherein a measuring step of the characteristics extracted by filtering techniques using filters is provided selected from the group consisting of exponential, logarithmic, laplacian, gaussian or other filters and/or a measurement phase of characteristics extracted from convolutional neural networks or other machine learning and deep learning algorithms.

4. The method according to claim 1, wherein using said data structure, a plurality of derived medical or veterinary images are viewable and interpretable by a human operator with color scale highlighting each of the statistically significant predictive characteristics implicitly present in the original medical or veterinary image not perceivable by the naked eye.

* * * * *